United States Patent
Kuwajima

(10) Patent No.: US 7,472,734 B2
(45) Date of Patent: Jan. 6, 2009

(54) TIRE/WHEEL ASSEMBLY AND RUN-FLAT SUPPORT MEMBER

(75) Inventor: Masatoshi Kuwajima, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 121 days.

(21) Appl. No.: 10/568,345

(22) PCT Filed: Sep. 3, 2004

(86) PCT No.: PCT/JP2004/012812

§ 371 (c)(1), (2), (4) Date: Feb. 14, 2006

(87) PCT Pub. No.: WO2005/023565

PCT Pub. Date: Mar. 17, 2005

(65) Prior Publication Data

US 2006/0260728 A1 Nov. 23, 2006

(30) Foreign Application Priority Data

Sep. 4, 2003 (JP) ............................. 2003-312615

(51) Int. Cl.
*B60C 17/00* (2006.01)
*B60C 17/04* (2006.01)
(52) U.S. Cl. ..................... 152/516; 152/152; 152/520
(58) Field of Classification Search ................. 152/516, 152/520, 152
See application file for complete search history.

(56) References Cited

U.S. PATENT DOCUMENTS 6,463,976 B1 * 10/2002 Glinz et al. ................. 152/520
6,915,824 B2 * 7/2005 Kuramori et al. ........... 152/156

FOREIGN PATENT DOCUMENTS

| JP | 10-297226 A1 | 11/1998 |
| JP | 2001-519279 A1 | 10/2001 |
| JP | 2004-050942 A | 2/2004 |
| JP | 2004-051003 | 2/2004 |
| JP | 2004-175271 | 6/2004 |
| JP | 2004-175272 A | 6/2004 |
| JP | 2004-175273 A | 6/2004 |

OTHER PUBLICATIONS

International Search Report, Dec. 14, 2004.

* cited by examiner

*Primary Examiner*—Justin Fischer
(74) *Attorney, Agent, or Firm*—Greer, Burns & Crain, Ltd.

(57) ABSTRACT

A tire/wheel assembly comprising: a wheel having a disc and a rim provided on the outer peripheral edge of the disc in such a manner that the widthwise center of the rim is offset towards one side; a pneumatic tire mounted on the rim; and a run-flat support member disposed in the cavity of the pneumatic tire, the run-flat support member having an annular shell and elastic rings, the annular shell including a support surface located radially outwardly thereof and two leg portions formed radially inwardly thereof in a straddling state, the support surface having a plurality of convexly curved surface sections that are widthwisely arranged, the elastic rings supporting the leg portions on the rim. One of the elastic rings located on the opposite side of the rim to the offset side is smaller in rigidity than the other of the elastic rings located on the offset side.

4 Claims, 1 Drawing Sheet

TIRE/WHEEL ASSEMBLY AND RUN-FLAT SUPPORT MEMBER

TECHNICAL FIELD

The present invention relates to tire/wheel assemblies and run-flat support members, and more particularly, to a tire/wheel assembly and a run-flat support member used therefor, in which durability can be improved.

TECHNICAL BACKGROUND

In response to demands in the market, there have been proposed many technologies which allow a vehicle to urgently travel several hundreds kilometers when a pneumatic tire thereof is punctured during traveling. These many proposals include a technology that allows for run-flat operation by supporting a punctured pneumatic tire with a support member mounted on a rim in the cavity of the tire seated on the rim.

The above run-flat support member comprises an annular shell having a support surface located radially outward with two convexly curved surface sections arranged widthwisely thereof and a leg structure in an open state disposed radially inward, and elastic rings attached to two leg portions of the leg structure, and is supported on the rim via the elastic rings. The run-flat support member allows existing wheels to be used without any specific modifications, and can therefore be advantageously adopted without causing confusions in the market (see Japanese Patent Application Publication Nos. 10-297226 and 2001-519279, for example).

Wheels in common use comprise a disc and a rim fixed to the outer peripheral edge of the disc in such a manner that the widthwise center of the rim is offset towards one side (vehicle inner side), thereby increasing the space of the vehicle inner side surrounded by the disc and rim to accommodate parts mounted on the vehicle.

A tire/wheel assembly including the above run-flat support member mounted on a wheel with such an offset rim has such a problem that a portion of the tire supported by one convexly curved surface section located on the opposite side (vehicle outer side) of the rim to the offset side is more subject to destruction than a portion of the tire supported by the other convexly curved surface section located on the offset side (vehicle inner side) during run-flat operation, which is one of the causes that degrade durability in run-flat mode.

DISCLOSURE OF THE INVENTION

An object of the present invention is to provide a tire/wheel assembly and a run-flat support member capable of improving run-flat durability.

In order to achieve the above object, a tire/wheel assembly according to the present invention comprises: a wheel having a disc and a rim provided on an outer peripheral edge of the disc in such a manner that a widthwise center of the rim is offset towards one side; a pneumatic tire mounted on the rim, the pneumatic tire having a cavity; and a run-flat support member disposed in the cavity of the pneumatic tire, the run-flat support member having an annular shell and elastic rings, the annular shell comprising a support surface located radially outwardly thereof and two leg portions formed radially inwardly thereof in a straddling state, the support surface having a plurality of convexly curved surface sections that are widthwisely arranged, the elastic rings supporting the leg portions on the rim, wherein one of the elastic rings located on an opposite side of the rim to the offset side is smaller in rigidity than the other of the elastic rings located on the offset side.

A run-flat support member according to the present invention to be mounted on a wheel having a disc and a rim provided on an outer peripheral edge of the disc in such a manner that a widthwise center of the rim is offset towards one side, comprises: an annular shell having a support surface located radially outwardly thereof and two leg portions formed radially inwardly thereof in a straddling state, the support surface having a plurality of convexly curved surface sections that are widthwisely arranged; and elastic rings for supporting the leg portions on the rim, wherein one of the elastic rings located on an opposite side of the rim to the offset side is smaller in rigidity than the other of the elastic rings located on the offset side.

According to the present invention described above, since the elastic ring located on the opposite side is more flexible than the elastic ring located on the offset side, the elastic ring on the opposite side counterbalances the offset side of the rim in flexure during run-flat operation, resulting in that the difference between the contact pressure of the convexly curved surface section located on the opposite side against the inner surface of the pneumatic tire and the contact pressure of the convexly curved surface section located on the offset side against the inner surface of the pneumatic tire can be smaller than before. Therefore, the inner surface of the pneumatic tire can be supported by the convexly curved surface sections with balance better than before, so the destruction of the tire portion supported by the convexly curved surface section located on the opposite side can be suppressed, enhancing run-flat durability.

BEST MODES FOR CARRYING OUT THE INVENTION

Figure 1:
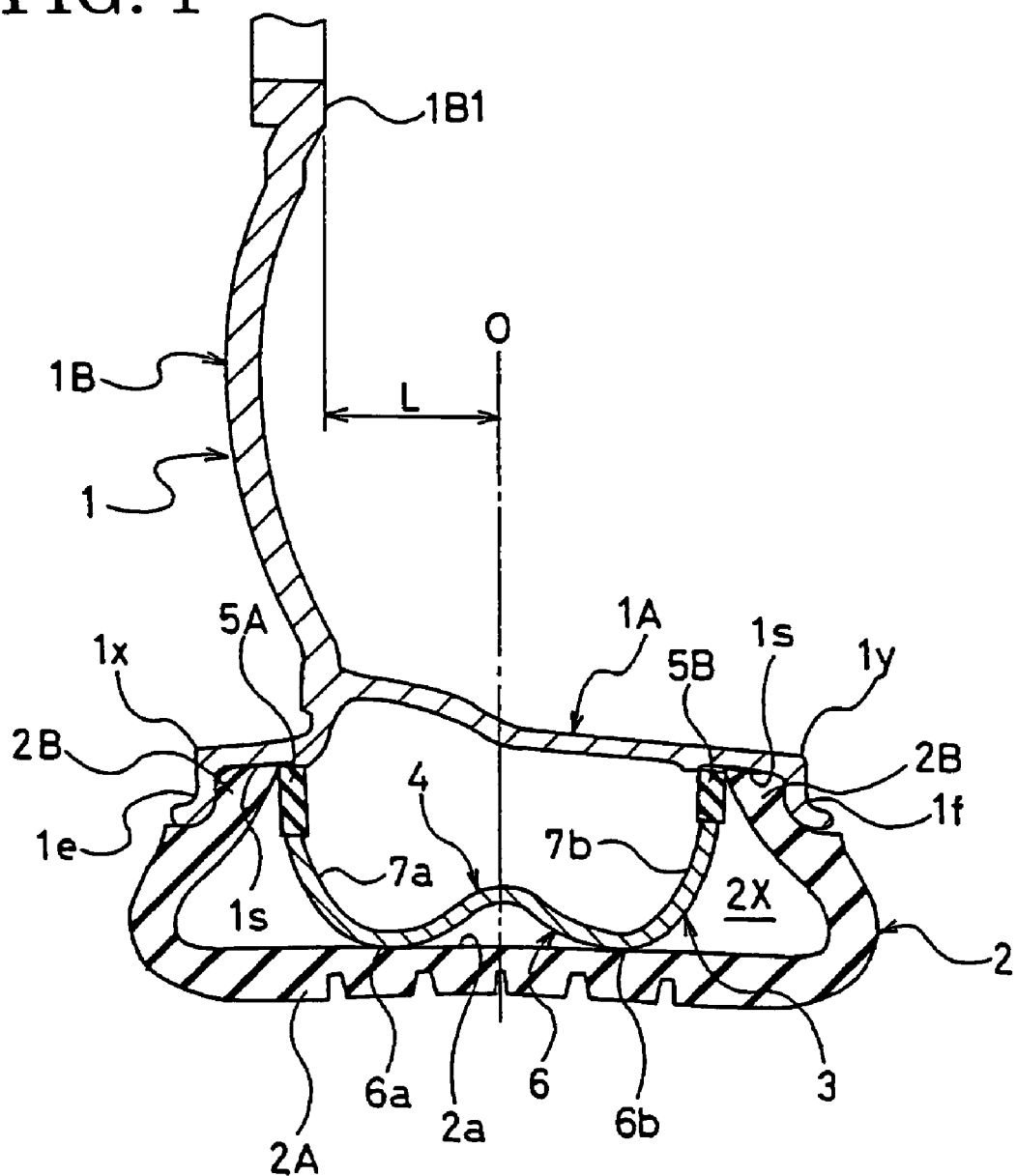
FIG. 1 is a partial cross-sectional view showing an embodiment of a tire/wheel assembly according to the present invention operated in a run-flat condition.

According to the present invention, the run-flat support member is formed as an annular member to be inserted into the cavity of a pneumatic tire. This run-flat member is formed so as to have an outer diameter smaller than the diameter of the cavity of the pneumatic tire to maintain a constant distance from the inner surface of the tire facing the cavity, and is formed so as to have an inner diameter which is substantially equal in size to the inner diameter of the beads of the pneumatic tire. The run-flat support member is inserted into the pneumatic tire, and mounted on the rim of a wheel together with the pneumatic tire to form a tire/wheel assembly. This tire/wheel assembly is mounted on a vehicle, and when the pneumatic tire is punctured during traveling, the punctured tire is supported by the radially outer surface of the run-flat support member to thereby allow for run-flat operation.

The above-described run-flat support member includes a annular shell and elastic rings as main parts.

The annular shell has a continuous support surface formed radially outward for supporting a punctured tire, and right and left sidewalls as two leg portions in a straddling shape disposed radially inward. The radially outer support surface is convexly formed radially outward in across-sectional shape taken along a plane orthogonal to the circumferential direction thereof, and includes at least two convexly curved surface sections that are widthwisely arranged. Formation of the support surface in such a way as to arrange two or more convexly curved surface sections provides the support surface with two or more dispersed contact areas with respect to the inner surface of the tire (inner surface facing the cavity) to thereby reduce localized wear on the tire inner surface, and therefore, the run-flat operation distance can be extended.

The elastic rings are attached to the ends of the two leg portions formed in a straddling state on the radially inner side of the annular shell, respectively, and come into engagement with the right and left seats of the rim to thereby support the annular shell. The elastic rings are formed of rubber or elastic resin, and not only mitigate the vibration and impact of the annular shell receiving from the punctured tire, but also prevent slipping with respect to the rim seats to stably support the annular shell.

The annular shell is formed of a rigid material since the run-flat support member has to support a vehicle weight through the punctured tire. Constituent materials used for the rigid material include metals, resins and the like. The metals may include, for example, steel and aluminum. The resins may include thermoplastic resins and thermosetting resins. The thermoplastic resins may include nylon, polyester and the like, and the thermosetting resins may include epoxy resins, unsaturated polyester resins, etc. The resins may be used alone or mixed with reinforcing fibers as fiber-reinforced resins.

The elastic rings may be formed of any kind of rubber or elastic resin if they can stably support the annular shell. Examples of the rubber may include natural rubber, isoprene rubber, styrene-butadiene rubber, butadiene rubber and butyl rubber, and examples of the elastic resin may include resin foam such as polyurethane foam.

The run-flat support member used for a tire/wheel assembly according to the present invention is premised on the structure described above.

An embodiment of the present invention will be described in detail below with reference to the attached drawing.

FIG. 1 is a cross-sectional view showing a main part of a tire/wheel assembly according to an embodiment of the present invention; reference numeral 1 denotes a wheel, reference numeral 2 denotes a pneumatic tire, and reference numeral 3 denotes a run-flat support member.

The wheel 1 comprises a disc 1B and an annular rim 1A fixed to the outer peripheral edge of the disc 1B in such a manner that the widthwise center O of the rim is offset towards one side. The pneumatic tire 2 is mounted on the rim 1A and the run-flat support member 3 is disposed in the cavity 2X of the pneumatic tire 2. The wheel 1, pneumatic tire 2, and run-flat support member 3 are arranged in coaxial alignment with each other with respect to the axis (not shown) of rotation of the wheel 1 so as to be in the form of an annulus.

Although not shown in the drawing, the pneumatic tire 2 has a carcass ply extending between right and left beads 2B. A plurality of belt plies are provided radially outwardly of the carcass ply in a tread 2A. A bead core is embedded in each of the right and left beads 2B, and the carcass ply has opposing ends that are turned up around the bead cores from the inner side towards the outer side of the tire.

The run-flat support member 3 comprises an annular shell 4 formed of a rigid material such as metal or rein, and right and left elastic rings 5A and 5B formed of an elastic material such as rubber or elastic resin.

The annular shell 4 includes a support surface 6 located radially outwardly thereof with two convexly curved surface sections 6a and 6b that are arranged widthwisely of the annular shell 4 and have the substantially same radius of curvature; the support surface 6 are spaced apart from the inner surface 2a of the tread 2A of the pneumatic tire 2 when the pneumatic tire 2 is operated in a normal condition, and when punctured, the support surface 6 supports the inner surface 2a of the tread 2A of the punctured pneumatic tire 2.

The annular shell 4 also includes two side walls located radially inwardly thereof, formed as leg portions 7a and 7b that are straddle-shaped, and the elastic rings 5A and 5B are attached to the radially inner sides of the leg portions 7a and 7b, respectively.

The right and left elastic rings 5A and 5B are different in rigidity, and the elastic ring 5A positioned on the opposite side of the rim to the offset side is smaller in rigidity than the elastic ring 5B positioned on the offset side, according to the offset amount. The rigidity of the elastic ring 5A on the opposite side can be made lower than that of the elastic ring 5B on the offset side by, for example, making the elastic ring 5A higher in height than the elastic ring 5B on the offset side (the width is equal) as shown in the drawing, making the elastic ring 5A thinner in thickness than the elastic ring 5B, using a elastic material for the elastic ring 5A having modulus of elasticity lower that that for the elastic ring 5B, or a combination thereof. It is preferable, in terms of seating stability on the rim and ease of distinguishing the elastic ring 5A on the opposite side from the elastic ring 5B on the offset side, that the rigidity of the elastic ring 5A be made lower by making the elastic ring 5A on the opposite side higher in height than the elastic ring 5B on the offset side.

The run-flat support member 3 having the elastic rings 5A and 5B constructed as described above is inserted into the cavity 2X of the pneumatic tire 2, and the elastic rings 5A and 5B of the run-flat support member 3 are seated on the rim seats 1s, 1s of the rim 1A together with the beads 2B, 2B of the pneumatic tire 2.

The present inventor has found the following through an intense study on the cause of earlier destruction of a portion of the tire supported by the convexly curved surface section 6a located on the opposite side (vehicle outer side) of the rim to the offset side.

That is, the two convexly curved surface sections 6a and 6b support the inner surface 2a of the tread 2A of the pneumatic tire 2 during run-flat operation as shown in FIG. 1; a tire support load then acts on the rim 1A, causing greater deflections on the offset side of the rim 1A. As a result, the contact pressure of the convexly curved surface section 6a on the opposite side against the inner surface 2a of the pneumatic tire 2 is higher than that of the convexly curved surface section 6b on the offset side against the inner surface 2a of the pneumatic tire 2, whereby a portion of the tire supported by the convexly curved surface section 6a on the opposite side is subject to destruction in advance of a portion of the tire supported by the convexly curved surface section 6b on the offset side.

Therefore, in the present invention, the elastic ring 5A located on the opposite side is smaller in rigidity than the elastic ring 5B located on the offset side, as described above. This makes the elastic ring 5A positioned on the opposite side more flexible than the elastic ring 5B positioned on the offset side, so the elastic ring 5A on the opposite side counter balances the offset side of the rim 1A in flexure, which can make the difference between the contact pressure of the convexly curved surface section 6a located on the opposite side against the inner surface 2a of the pneumatic tire 2 and the contact pressure of the convexly curved surface section 6b located on the offset side against the inner surface 2a of the pneumatic tire 2 smaller than before during run-flat operation. Therefore, since the inner surface 2a of the pneumatic tire 2 can be supported by the convexly curved surface sections 6a and 6b with balance better than before, the destruction of the tire portion supported by the convexly curved surface section 6a can be suppressed, enhancing run-flat durability.

In the present invention, if G1 (/mm) is the rigidity of the elastic ring 5A on the opposite side, and G2 (/mm) is the rigidity of the elastic ring 5B on the offset side, the relationship between the rigidities G1 and G2 and the offset amount L (mm) of the rim 1A preferably satisfies the following expression.

$$0.0012 \leq (G2-G1)/(G1 \times L) \leq 0.020 \quad (1)$$

The rigidity referred here is measured as follows.

First, the annular shell is removed from the elastic ring, and the elastic ring is then cut to obtain a sample having a length of 10 cm in the circumferential direction of the ring. If the radially inner end of the leg portion of the annular shell is buried in the elastic ring, the annular shell is removed from the elastic ring in such a manner that the leg portion is cut off along the radially outer surface of the elastic ring with the buried radially inner end of the leg portion being left in the elastic ring. A load W (50 kgf (454 N)) is applied to the cut sample from a direction corresponding to the ring radial direction. That is, the sample is put on a horizontally flat test surface, keeping its ring radially inner surface side down, and a weight having a load of 50 kgf (454 N) is then put on the sample to compress it with the weight contacting the entire upper surface of the sample. The amount δ of deflection that is defined as the amount of compression at this time is measured at a room temperature, and the reciprocal of the measurement value is a value (/mm) of the rigidity of the elastic ring.

The offset amount L is a wheel offset distance defined in normal wheels, which is a distance measured parallel to the tire axis (not shown) from the vehicle attachment face 1B1 of the center portion of the disc 1B to the rim-widthwise center o of the rim 1A.

The satisfaction of the above expression (1) makes the difference between the contact pressures of the convexly curved surface portions 6a and 6b against the inner surface 2a of the pneumatic tire 2 smaller, whereby the convexly curved surface portions 6a and 6b can come into contact therewith more evenly; therefore, the inner surface 2a of the pneumatic tire 2 can be supported by the convexly curved surface sections 6a and 6b with much better balance; accordingly, run-flat durability can be further improved. More preferably, the above range is from 0.0020 to 0.015.

When the height of the elastic rings 5A and 5B is changed to vary the rigidity, the elastic ring 5A on the opposite side is preferably 3 mm to 14 mm, and more preferably 5 mm to 10 mm higher than the elastic ring 5B on the offset side in terms of rendering the contact pressures of the convexly curved surface portions 6a and 6b more even. It should be noted that the other things other than the height of the elastic rings 5A and 5B, that is, the material and width of the elastic rings 5A and 5B are the same.

The specification by the expression described above is preferably adopted in the case of running straight in the run-flat mode; in the case of run-flat operation including turning operation in which lateral forces are applied, if M is a ratio M2/M1 where M1 is the wheel-radial deflection amount at a position of the radially most inwardly located outer edge 1x of the rim flange 1e on the opposite side of the rim 1A to the offset side and M2 is the wheel-radial deflection amount at a position of the radially most inwardly located outer edge 1y of the rim flange 1f on the offset side of the rim 1A, the relationship between the rigidity G1 (/mm) of the elastic ring 5A on the opposite side and the rigidity G2 (/mm) of the elastic ring 5B on the offset side described above preferably satisfies the following expression in relation to the ratio M.

$$0.009 \leq (G2-G1)/(G1 \times M) \leq 0.125 \quad (2)$$

The deflection amount M1, M2 referred here is a deflection amount measured when the pneumatic tire is mounted on a standard rim described in JATMA (JATMA YEAR BOOK 2002), an air pressure of 200 kPa is applied thereto, and a load of 80% of the load ability corresponding to an air pressure of 200 kPa described in the JATMA is applied thereto in the radial direction and lateral direction (toward the offset side) of the tire.

The deflection amount M1 of the opposite side of the rim 1A is represented by "+" when deflected radially outwardly of the wheel, and by "−" when deflected radially inwardly of the wheel. The deflection amount M2 of the offset side of the rim 1A is represented by "+" when deflected radially inwardly of the wheel, and by "−" when deflected radially outwardly of the wheel. The reason why specified as described above is that, when vertical load and lateral force are applied to the tire/wheel assembly during turning operation, a moment of force is created counterclockwise around the center of the tire in the tire/wheel assembly shown in FIG. 1, whereby the opposite side of the rim 1A deflects radially outward and the offset side of the rim 1A deflects radially inward.

If it is not easy to decide the positions of the radially most inwardly located outer edges 1x and 1y because the regions including the outer edges 1x and 1y are chamfered in the form of circular arcs or the like for purposes of rim design, the central positions of the chamfered faces in a cross-sectional shape can be the positions of the outer edges 1x and 1y. Since M in the above expression is obtained by relative comparison of the deflection amounts M1 and M2, there is no problem with the positions of the outer edges 1x and 1y decided as mentioned above.

During turning operation of a vehicle, a great lateral force toward the outer side of the vehicle is applied to a tire located outwardly of the turning vehicle, that is, a tire mounted on the left side of the vehicle when turning right, and a tire mounted on the right side of the vehicle when turning left. A wheel 1 offset as described above is mounted on a vehicle with its offset side facing to the vehicle; therefore, the satisfaction of the above expression (2) can make the difference between the contact pressures of the convexly curved surface sections 6a and 6b against the inner surface 2a of the pneumatic tire 2 further smaller during run-flat turning operation with the lateral force applied thereto, thereby putting the convexly curved surface sections 6a and 6b into contact therewith more evenly. Therefore, the run-flat support member 3 can support the inner surface 2a of the pneumatic tire 2 via the convexly curved surface sections 6a and 6b of the annular shell 4 with much better balance, thus further improving run-flat durability. The above range is preferably 0.014 to 0.100.

In the above embodiment, an example is shown of the case where the support surface 6 of the annular shell 4 has two convexly curved surface sections 6a and 6b; however, the number of the convexly curved surface sections is not limited to two, but may be a plural number that is three or more.

The present invention is preferably applicable to a tire/wheel assembly and a run-flat support member used for passenger cars in particular.

EXAMPLE 1

Prepared were tire/wheel assemblies according to the present invention (present example A, B and C) and prior art (conventional example), each having a tire of size 205/55R16 and a rim of size 15×6 1/2JJ, the present invention tire/wheel assemblies each having a construction shown in FIG. 1 in which the elastic ring on the opposite side was smaller in rigidity than the elastic ring on the offset side, the prior art tire/wheel assembly being constructed such that the two elastic rings were the same in rigidity.

In the present invention tire/wheel assemblies, the values of the expression (G2−G1)/(G1×L) were as shown in Table 1.

Evaluation testing for run-flat durability was carried out on the test tire/wheel assemblies according to the following measurement method, obtaining the results shown in Table 1.

Run-Flat Durability

Each of the test tire/wheel assemblies having an air pressure of 0 kPa was mounted as a front right wheel on a front drive vehicle of 2.5 liter displacement, and when the vehicle was run counterclockwise at a speed of 90 km/h in a circuit track, the distance until the vehicle could no longer run was measured. The results of evaluation are represented by an index number where the prior art tire/wheel assembly is 100. As the value is greater, run-flat durability is better.

The same sized tires and rims as described above were used for wheels of the vehicle other than the front right wheel, with the tires each having an air pressure of 200 kPa.

TABLE 1

|  | Conventional Example | Present Example A | Present Example B | Present Example C |
|---|---|---|---|---|
| (G2 − G1)/ (G1 × L) | — | 0.0012 | 0.0040 | 0.020 |
| Run-flat Durability | 100 | 105 | 110 | 106 |

From Table 1, it can be seen that the tire/wheel assemblies of the present invention can improve durability during run-flat operation.

EXAMPLE 2

Prepared were tire/wheel assemblies according to the present invention (present example D, E and F), each having the same sized tire and rim as in Example 1 and a construction shown in FIG. 1, in which the elastic ring on the opposite side was smaller in rigidity than the elastic ring on the offset side, and the value of the expression (G2−G1)/(G1×M) was as shown in Table 2.

Evaluation testing for run-flat durability was carried out on the test tire/wheel assemblies according to the measurement method shown in Example 1, obtaining the results shown in Table 2.

TABLE 2

|  | Present Example D | Present Example E | Present Example F |
|---|---|---|---|
| (G2 − G1)/(G1 × M) | 0.009 | 0.025 | 0.125 |
| Run-flat Durability | 107 | 113 | 110 |

From Table 2, it can be seen that the tire/wheel assemblies of the present invention can improve durability during fun-flat operation.

INDUSTRIAL APPLICABILITY

The tire/wheel assembly of the present invention having the aforementioned excellent effect can be very effectively utilized as a tire/wheel assembly that is mounted on a vehicle and allows for run-flat operation.

What is claimed is:

1. A tire/wheel assembly comprising:
a wheel having a disc and a rim provided on an outer peripheral edge of the disc in such a manner that a widthwise center of the rim is offset towards one side and the rim undergoes greater deflections on its offset side than on its opposite side during run-flat operation,
a pneumatic tire mounted on the rim, the pneumatic tire having a cavity; and
a run-flat support member disposed in the cavity of the pneumatic tire, the run-flat support member having an annular shell and elastic rings, the annular shell comprising a support surface located radially outwardly thereof and two leg portions formed radially inwardly thereof in a straddling state, the support surface having a plurality of convexly curved surface sections that are widthwisely arranged, the elastic rings supporting the leg portions on the rim,
wherein one of the elastic rings located on the opposite side of the rim to the offset side is smaller in rigidity than the other of the elastic rings located on the offset side,
wherein the plurality of convexly curved surface sections of the support surface of the annular shell are equal in radius of curvature,
wherein further the elastic rings satisfy the following expression:

$$0.0012 \leq (G2-G1)/(G1 \times L) \leq 0.020$$

where G1 is the rigidity of the elastic ring on the opposite side, G2 is the rigidity of the elastic ring on the offset side, and L is the offset amount of the rim.

2. A tire/wheel assembly comprising:
a wheel having a disc and a rim provided on an outer peripheral edge of the disc in such a manner that a widthwise center of the rim is offset towards one side and the rim undergoes greater deflections on its offset side than on its opposite side during run-flat operation,
a pneumatic tire mounted on the rim, the pneumatic tire having a cavity; and
a run-flat support member disposed in the cavity of the pneumatic tire, the run-flat support member having an annular shell and elastic rings, the annular shell comprising a support surface located radially outwardly thereof and two leg portions formed radially inwardly thereof in a straddling state, the support surface having a plurality of convexly curved surface sections that are widthwisely arranged, the elastic rings supporting the leg portions on the rim,
wherein one of the elastic rings located on the opposite side of the rim to the offset side is smaller in rigidity than the other of the elastic rings located on the offset side,
wherein the plurality of convexly curved surface sections of the support surface of the annular shell are equal in radius of curvature, wherein further the elastic rings satisfy the following expression:

$$0.009 \leq (G2-G1)/(G1 \times M) \leq 0.125$$

where G1 is the rigidity of the elastic ring on the opposite side, G2 is the rigidity of the elastic ring on the offset side, and M is a ratio of M2/M1, M1 being a wheel-radial radial deflection amount at a position of a radially most inwardly located outer edge of a rim flange on the opposite side of the rim, M2 being a wheel-radial deflection amount at a position of a radially most inwardly located outer edge of a rim flange on the offset side of the rim.

3. A tire/wheel assembly according to claim 1, wherein the elastic ring on the opposite side is 3 mm to 14 mm greater in height than the elastic ring on the offset side.

4. A tire/wheel assembly according to claim 1 or claim 2, wherein the elastic ring on the opposite side is smaller in rigidity than the elastic ring on the offset side corresponding to an offset amount of the rim.

* * * * *